United States Patent [19]

Kanazawa

[11] Patent Number: 4,510,813

[45] Date of Patent: Apr. 16, 1985

[54] TEMPERATURE COMPENSATION CIRCUIT FOR STRAIN GAUGES

[75] Inventor: Jitsuo Kanazawa, Shiga, Japan

[73] Assignee: Kabushiki Kaisha Ishida Koki Seisakusho, Shiga, Japan

[21] Appl. No.: 448,205

[22] Filed: Dec. 9, 1982

[30] Foreign Application Priority Data

Dec. 23, 1981 [JP] Japan .......................... 56-194440[U]

[51] Int. Cl.³ .............................................. G01B 7/16
[52] U.S. Cl. ............................................ 73/766; 338/9
[58] Field of Search .................. 73/766; 338/8, 9, 10; 323/366

[56] References Cited

U.S. PATENT DOCUMENTS

| | | | |
|---|---|---|---|
| 2,120,335 | 6/1938 | Lederer | 338/10 |
| 2,470,051 | 5/1949 | Ruge | 338/9 |
| 3,111,620 | 11/1963 | Baker | 338/9 X |
| 3,178,938 | 4/1965 | Ruge | 73/766 X |
| 3,575,053 | 4/1971 | Telinde | 73/766 X |
| 4,174,639 | 11/1979 | Raven | 73/766 |

Primary Examiner—Jerry W. Myracle
Attorney, Agent, or Firm—Armstrong, Nikaido Marmelstein & Kubovcik

[57] ABSTRACT

A temperature compensation circuit for strain gauges fixed to an object to be measured and adapted to take out an output conforming to a strain by being fed with a constant voltage, wherein a compensation resistors in the form of a combination of two or more kinds of resistors each made of a pure single metal material having a resistance versus temperature characteristic equivalent to the output voltage versus temperature characteristic of the bridge circuit of strain gauges are inserted and connected at a predetermined position on the voltage supply side or output take-out side of the bridge circuit of strain gauges thereby compensating for variations in the strain gauge output due to temperature variations with high accuracy. The temperature compensation circuit for strain gauges according to the present invention not only has very high accuracy of temperature compensation but also can be produced with high yield.

8 Claims, 13 Drawing Figures

TEMPERATURE COMPENSATION CIRCUIT FOR STRAIN GAUGES

BACKGROUND OF THE INVENTION

The present invention relates to improvements in a temperature compensation circuit for strain gauges used in load cells, etc.

More particularly, the invention relates to a novel strain gauge temperature compensation circuit adapted to compensate for variations in strain gauge output due to temperature variations with high accuracy.

It is well-known that load cells are widely used as weight detectors for weighing machines. A beam is fixed at one end thereof and an object to be measured is placed at the other end, so that weighing is effected by taking out a change in resistance value, as an electric signal, corresponding to the amount of strain in the strain gauge fixed to a portion of the beam. Because of the use of a nickel resistor alone as a compensation resistor in the temperature compensation circuit of such conventional strain gauge, the ability to compensate for variations in strain gauge output due to variations in the temperature of objects to be measured has been insufficient and it has been difficult to maintain satisfactory accuracy of measurement in practice. The present invention is intended to provide a temperature compensation circuit for strain gauges which eliminates the long-standing problem with the conventional strain gauge temperature compensation circuit and which is high in temperature compensation accuracy and in yield of production.

SUMMARY OF THE INVENTION

The present invention has for its principal object the improvement of the conventional strain gauge temperature compensation circuit, and its essence resides in a temperature compensation circuit for strain gauges adapted to take out an output conforming to a strain by being fed with a constant voltage, wherein compensation resistors in the form of a combination of two or more kinds of resistors each made of a pure single metal material having a resistance versus temperature characteristic equivalent to the output voltage versus temperature characteristic of the bridge circuit of strain gauges are inserted and connected in a joined or distributed state at a predetermined position on the voltage supply side or output take-out side of the bridge circuit of strain gauges, thereby compensating for variations in strain gauge output due to temperature variations.

BRIEF DESCRIPTION OF THE DRAWINGS

FIGS. 2 through 5 are explanatory views illustrating preconditions for the present invention, wherein FIG. 2 is a temperature compensation circuit diagram; FIG. 3 is a diagram showing the output voltage versus temperature characteristic of the bridge circuit thereof; FIG. 4 is a diagram showing the respective resistance versus temperature characteristics of the temperature compensation resistors thereof; and FIG. 5 is a diagram showing a temperature characteristic with respect to the net applied voltage on the bridge circuit thereof;

FIGS. 6 through 9 are explanatory views showing an embodiment of the present invention, wherein FIG. 6 is a temperature compensation circuit diagram thereof; FIG. 7 is an output voltage versus temperature characteristic diagram of the bridge circuit thereof; FIG. 8 is a resistance versus temperature characteristic diagram of the compensation resistors thereof; and FIG. 9 is a diagram showing a temperature characteristic with respect to the net applied voltage on the bridge circuit thereof;

DESCRIPTION OF THE PREFERRED EMBODIMENT

The present invention will now be described in detail with reference to the accompanying drawings.

Figure 1:
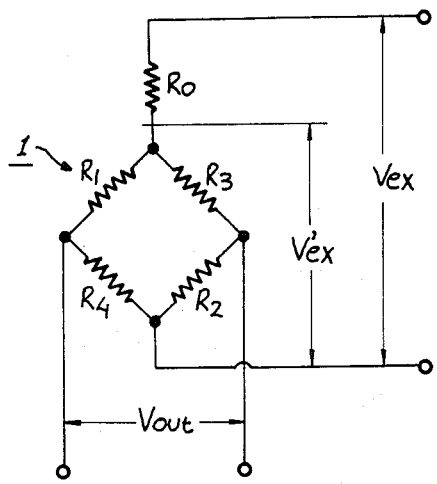
FIG. 1 is a circuit diagram showing a conventional common temperature compensation circuit.

In FIG. 1, the characters R1 and R2 denote strain gauges fixed to the extensible portion of the beam of a load cell, and R3 and R4 denote strain gauges fixed to the contractible portion, and Ro denotes a nickle resistor inserted and connected for temperature compensation purposes.

The basic principle of this circuit is that the strain gauges R1, R2, R3, R4 are connected to form a bridge circuit 1 having two pairs of opposed apexes, one of said pairs having a constant voltage applied thereacross so that an output voltage corresponding to a strain is taken out from the other.

Thus, the load cell is made of steel, duralumin or the like, and the beam itself extends and contracts when subjected to temperature variations. Therefore, even if the load on the load cell is constant, because of this strain force being applied to the strain gauges, the output voltage Vout is influenced by temperature even where temperature errors in the strain gauges R1, R2, R3, R4 are negligible, so that temperature error will be produced if the bridge circuit 1 alone is used.

Figure 3:
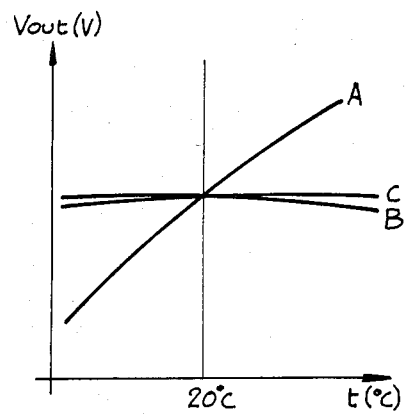
Figure 4:
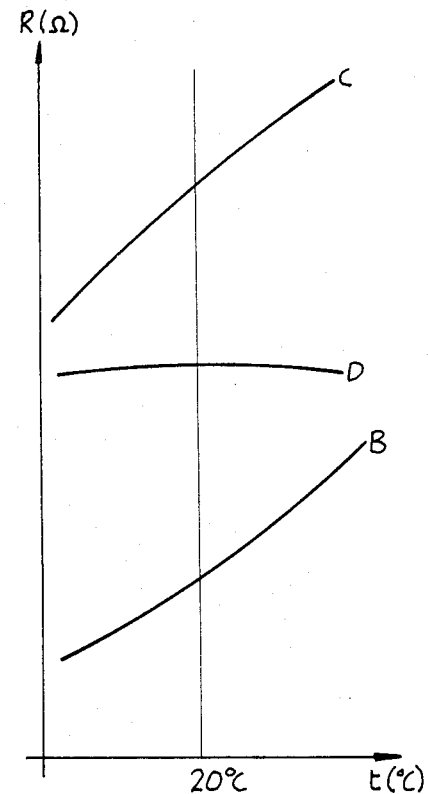

It is the nickel resistor Ro that is inserted and connected for the purpose of compensating for this temperature error. That is, with attention paid to the fact that the output voltage versus temperature characteristic of the bridge circuit 1 itself changes approximately linearly as shown in FIG. 3 A under the condition that the load on the load cell is constant, the characteristic curve is taken to be a linear function and as a resistor having an output voltage versus temperature characteristic agreeing with said linear function, the nickel resistor Ro having a large linear positive temperature coefficient as shown in FIG. 4 B is selected and is inserted and connected in series on the input side where a constant applied voltage Vex is applied as shown in FIG. 1, so as to compensate for temperature.

Figure 5:
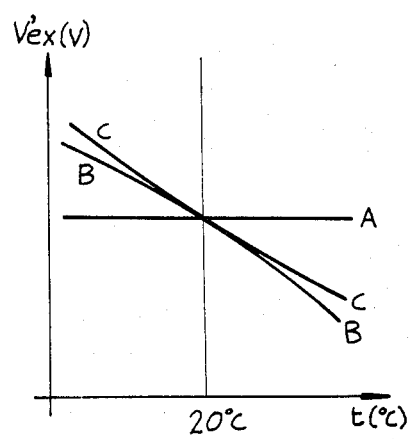

Then, the net applied voltage V'ex on the bridge circuit 1 is compensated by the voltage drop across the nickel resistor Ro in such a manner that in FIG. 5 the curve A with no nickel resistor Ro is changed to the curve B. In addition, in this case 20° C. is used as the reference temperature in design, and the applied voltage Vex is higher than were there is no nickel resistor Ro, in order to ensure that the net applied voltage V'ex at 20° C. is constant. As a result, the temperature characteristic with respect to the output voltage Vout in the circuit of FIG. 1 is as shown in FIG. 3 B under the condition that the load on the load cell is constant, so that complete temperature compensation is impossible with the nickel resistor Ro alone used, presenting a characteristic curve which is slightly upward convex as illustrated. According to this characteristic curve, the error increases as the temperature deviates from the reference value of 20° C. toward the lower temperature side or higher temperature side, and such an error can reach a size that cannot be overlooked where high accuracy of weighing is required, raising practical problems.

The cause of this error is that temperature compensation is based on the assumption that the output voltage versus temperature characteristic of the bridge circuit 1 itself is a linear function. That is, this output voltage versus temperature characterisitc includes, in fact, a secondary component which is negative; thus, as shown in FIG. 3 A, the characteristic curve is slightly upward convex. Further, although the nickel resistor Ro has been considered with the secondary temperature coefficient omitted, it actually includes a positive secondary component curved downward convex, as shown in FIG. 4 B. Thus, since the charcteristics of these curves are different from what they actually are, errors will be produced.

As a means for solving the above problems, I previously applied for a patent on an invention of a temperature compensation circuit for strain gauges described below.

Figure 2:
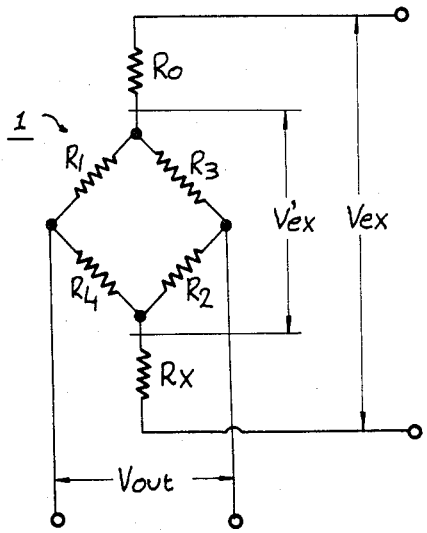

In the prior invention, the bridge circuit 1 compensated by the nickel resistor Ro alone shown in FIG. 1 has added and connected thereto a compensation resistor Rx to compensate the net applied voltage V'ex on the bridge circuit 1 as shown in FIG. 2. As for this compensation resistor Rx, a manganin resistor, which is an alloy made mainly of copper, manganese and nickel, is used, for example. By changing the proportions of the components, particularly the proportion of manganese, this manganin resistor is adjusted to have such a characteristic that the secondary temperature coefficient is negative and the primary temperature coefficient is zero or approximately zero, as shown in FIG. 4 D. This is the same resistance versus temperature characteristic as that shown in FIG. 3 B which is the output voltage versus temperature characteristic of the circuit of FIG. 1. Therefore, the resistance versus temperature characteristic obtained by combining the nickel resistor Ro and manganin resistor Rx is as shown in FIG. 4 C, being equivalent to the output voltage versus temperature characteristic of the bridge circuit having no compensation resistors Ro and Rx shown in FIG. 3 A. The net applied voltage V'ex on the bridge circuit 1 is, in this case, as shown in FIG. 5 C, being axially symmetrical with the output voltage versus temperature characteristic shown in FIG. 3 A. Therefore, the output voltage versus temperature characteristic of the circuit having the nickel resistor Ro and manganin resistor Rx in FIG. 2 is such that as a result of the primary and secondary components canceling out each other as shown in FIG. 3 C, it becomes flat, producing no temperature error, enabling measurement with high accuracy. In addition, the applied voltage Vex in this case is made higher by an amount corresponding to the voltage drop across the manganin resistor Rx in order to ensure that the net applied voltage V'ex at 20° C. equals that for the circuit of FIG. 1.

In the prior invention shown in FIG. 2, however, since the resistor made of an alloy consisting of two or more metals, such as manganin resistor, is employed as the compensation resistor Rx, there has been a disadvantage that when the compensation resistor Rx is produced it is difficult to make the alloy composition ratio uniform. That is, if the alloy composition ratio deviates from the predetermined value even slightly, the resulting resistance versus temperature characteristic deviates from the desired one, so that the output voltage versus temperature characteristic of the circuit of FIG. 2 would deviate from the flat characteristic as shown in FIG. 3 C. Further, the production of the alloy of which the manganin resistor is made is usually not with a single manganin resistor as a unit but with a predetermined quantity as a lot unit. If the predetermined component ratio is not obtained during the production of the alloy, the temperature characteristics of the resulting compensation resistors Rx belonging to that lot will deviate from the preset value.

Therefore, even if the magnitude of the resistance of the compensation resistor having the predetermined resistance versus temperature characteristic and the component ratio of the alloy are determined at the time of design of the strain gauge, the above problem encountered in actual production makes it difficult to obtain, in practice, highly accurate temperature compensation. Further, the yield of production of strain gauge temperature compensation circuits based on this idea has been impossible to maintain on a satisfactory level owing to the difficulty of adjustment of said alloy component ratio.

With the above in mind, the present invention provides a strain gauge temperature compensation circuit which is high in temperature compensation accuracy and in yield of production.

Thus, the essence of the invention resides in the fact that rather than a single resistor made of alloy, a combination of two or more kinds of resistor each made of pure single metal material is used as said compensation resistor, thereby improving the temperature compensation accuracy.

That is, according to the invention, resistors of high purity made of single metal material can be obtained and their resistance versus temperature characteristic has a constant value with high accuracy. Therefore, if two or more metals of high purity are combined to form compensation resistors designed so that the resistance versus temperature characteristics of the resistors equal the output voltage versus temperature characteristic of the bridge circuit which is the object to be compensated, then the conventional drawback encountered in actual production can be eliminated; thus, even when there are variations in the temperature of the objects to be measured, the strain gauge temperature compensation circuit obtained which has high accuracy of measurement will not be influenced by such temperature variations. Further, the yield of production of said temperature compensation circuits is greatly improved.

Figure 6:
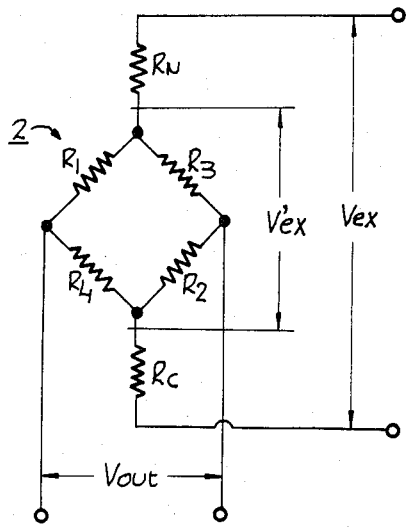
Figure 7:
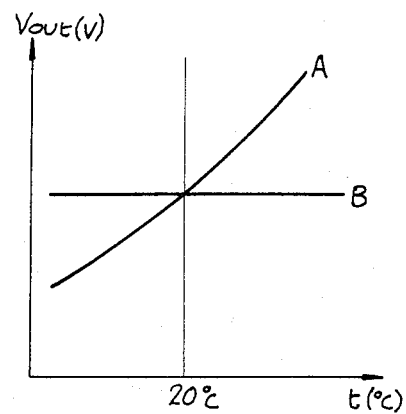
Figure 8:
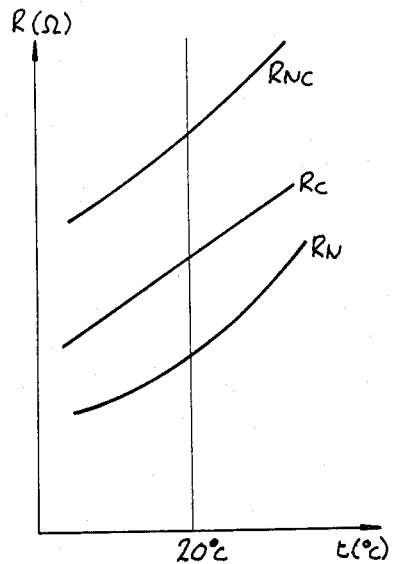
Figure 9:
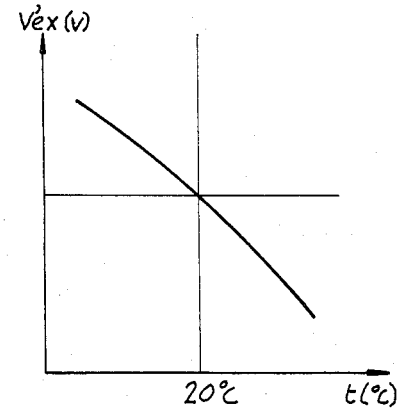

The production of a temperature compensation circuit according to the present invention is, for example, as shown in FIG. 6. In FIG. 6, a bridge circuit 2 has an output voltage versus temperature characteristic as shown in FIG. 7 A. That is, according to the the specification of a load cell, the secondary component has a value which is reverse to what is shown in FIG. 3 A. As the compensation resistors for temperature compensation, a nickel resistor $R_N$ and a copper resistor $R_C$ are used, these being distributively inserted and connected on the voltage supply side of the bridge circuit 2. The respective resistance versus temperature characteristics of the nickel resistor $R_N$ and copper resistor $R_C$ are as shown in FIG. 8, and if these resistor $R_N$ and $R_C$ are connected in series and their magnitudes and their resistance ratio are properly determined, the resistance versus temperature characteristic of the combined resistor becomes as shown at $R_{NC}$ in FIG. 8. This characteristic $R_{NC}$ is so determined that it is the same as the output voltage versus temperature characteristic of the bridge circuit 2 itself shown in FIG. 7 A, with the primary and secondary coefficients included. In the circuit of FIG. 6 in which the nickel resistor $R_N$ and copper resistor $R_C$ which form the compensation resistors are inserted and connected, the net applied voltage V'ex on the bridge circuit 2 itself is as shown in FIG. 9. That is, the temperature characteristic curve of this applied voltage V'ex is axially symmetrical with the output voltage versus temperature characteristic curve A of the bridge circuit 2 itself shown in FIG. 7. Therefore, the output voltage versus temperature characteristic of the temperature compensation circuit in FIG. 7 with the nickel resistor $R_N$ and copper resistor $R_C$ added thereto is flat as shown in FIG. 7 B as a result of the primary and secondary components canceling out each other. If, therefore, measurements of strain are made by using the temperature compensation circuit shown in FIG. 6, errors in measurement due to temperature variations will not be produced, so that highly accurate measurements become possible.

Figure 10:
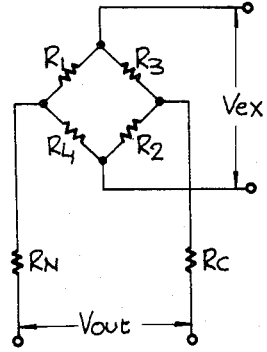
FIGS. 10 and 11 are temperature compensation circuits showing modified examples of the present invention.
Figure 11:
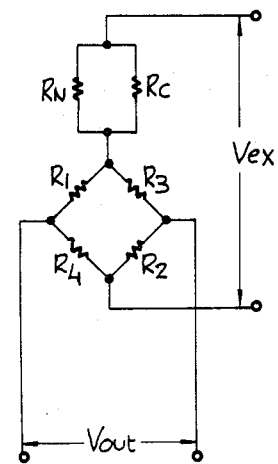

In addition, while the nickel resistor $R_N$ and copper resistor $R_C$ have been used as resistors made of pure single metal for temperature compensation in the above embodiment, as examples of combinations of resistors made of pure single metal usable in the present invention mention may be made of nickel and gold, nickel and silver, nickel and aluminum, etc. Further, in the above embodiment, compensation resistors are distributively inserted and connected to the voltage supply side of the bridge circuit 2, the position of insertion may be on the output take-out side. Further, the number of compensation resistors may be increased to three, four and so on, and the compensation resistors may be connected in parallel with respect to the constant voltage Vex or output voltage Vout besides being in series with respect thereto as described above. In the case of using three or more compensation resistors, series-parallel combinations may be made. For example, the temperature compensation circuit shown in FIG. 6 may be replaced by the temperature compensation circuit of FIG. 10 wherein the compensation resistors $R_N$ and $R_C$ are connected to the output side of the bridge circuit, or the temperature compensation circuit of FIG. 11 wherein the compensation resistors $R_N$ and $R_C$ are connected in parallel and this parallel combination is connected to the voltage supply side of the bridge circuit.

Figure 12:
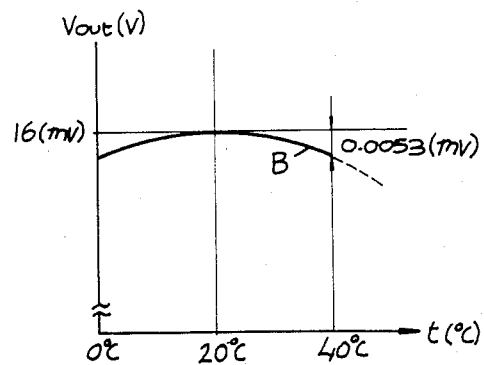
FIGS. 12 and 13 are output voltage versus temperature characteristic diagrams of the conventional example shown in FIG. 1 and the bridge circuit of the present invention shown in FIG. 6, respectively.

(Comparative Example) In the conventional strain gauge temperature compensation circuit shown in FIG. 1, a nickel resistor of 50$\Omega$ was used as the compensation resistor Ro and four resistors of 350$\Omega$ were used as the strain gauges R1, R2, R3 and R4 constituting the bridge circuit 1, and the output voltage versus temperature characteristic of said temperature compensation circuit was measure. That is, the output voltage Vout from the bridge circuit was measured when a load of 3,000 g was applied to the load cell with the temperature changed from 0° C. to 40° C. The result of measurement is shown in FIG. 12. In this comparative example, since the reference temperature is set at 20° C., 16 mv/3,000, i.e., 0.0053 mv corresponds to a load of 1 g. As is clear from FIG. 12, the output voltage Vout at 40° C. decreased to 15.0053 mv corresponding to the difference between 16 mv and 0.0053 mv, the decrease of 0.0053 mv representing an error in the output voltage Vout. Thus, it will be understood that an error of 1 g in terms of weight is produced by raising the temperature from 20° C. to 40° C.

EXAMPLE OF THE PRESENT INVENTION

Figure 13:
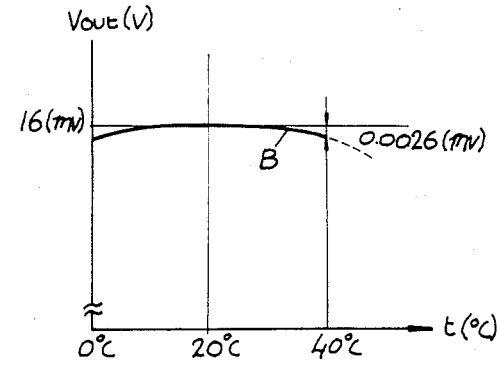

In the strain gauge temperature control circuit shown in FIG. 6 according to the present invention, a nickel resistor of 30$\Omega$ was used as the first compensation resistor $R_N$ and a copper resistor of 30$\Omega$ as the second compensation resistor $R_C$. Four resistors of 350$\Omega$ were used as the strain gauges R1, R2, R3 and R4 constituting the bridge circuit 2. The output voltage versus temperature characteristic of the temperature compensation circuit was measured under the same load and temperature conditions as in said comparative example. The result of measurement is shown in FIG. 13. In this example, the output voltage Vout at 40° C. decreased to 15.9974 mv corresponding to the difference between 16 mv and 0.0026 mv, the decrease of 0.0026 mv representing an error in the output voltage Vout. This means that raising the temperature from 20° C. to 40° C. produced an error of 0.5 g in terms of weight, and this error is about ½ of the error in said comparative example, demonstrating the superiority of the present invention.

In brief, the combination of compensation resistors of the present invention comprises two or more kinds of resistors each made of pure single metal material and provides a resistance versus temperature characteristic equivalent to the output voltage versus temperature characteristic of the bridge circuit of strain gauges, said compensation resistors being inserted and connected in a joined or distributed state at a predetermined position on the voltage supply side or voltage take-out side of the bridge circuit of strain gauges.

In addition, it goes without saying that the output voltage versus temperature characteristic of the bridge circuit 2 compensated for temperature by the present invention is not limited to the case in which the primary component is positive (rightwardly upward characteristic) and the secondary component is positive (downwardly convex characteristic) as shown in FIG. 7 A. In the case of other different combined characteristics where the primary and secondary are positive or negative, it is possible to likewise effect temperature compensation while maintaining high accuracy of measurement by selecting compensation resistors having corresponding characteristics.

In addition, the temperature compensation circuit according to the present invention can be likewise used in bridge circuits, etc., of strain gauges for measurement not only of weight but also of strain in load cells, and also in such case said circuit is capable of exerting highly accurate temperature compensation performance.

As has been described so far, according to the present invention, since temperature compensation of strain gauges is effected by a combined resistance obtained by combining two or more kinds of resistors each made of pure single metal material, the output voltage versus temperature characteristic of the temperature compensation circuit of strain gauges actually produced can be made flat in accordance with the design, so that a highly accurate strain gauge temperature compensation circuit which is immune from the influences of temperature variations can be obtained without fail. Further, a high yield can be expected in the production of said strain gauge temperature compensation circuit.

What is claimed is:

1. A temperature compensation circuit for strain gauges adapted to produce an output conforming to a strain by being fed with a constant voltage, said circuit being characterized in that compensation resistors comprising a combination of two or more kinds of resistors each made of pure single metal material and having a resistance versus temperature characteristic equivalent to the output voltage versus temperature characteristic of a bridge circuit of said strain gauges are connected to the bridge circuit of strain gauges, thereby compensating for variations in strain gauge output due to variations in temperature.

2. A temperature compensation circuit as set forth in claim 1, characterized in that said compensation resistors are inserted and connected to a predetermined position on the voltage supply side of the bridge circuit of strain gauges.

3. A temperature compensation circuit as set forth in claim 1, characterized in the said compensation resistors are inserted and connected to a predetermined position on the output take-out side of the bridge circuit of strain gauges.

4. A temperature compensation circuit as set forth in claim 1, characterized in that said compensation resistors are a combination of nickel resistor and copper resistor.

5. A temperature compensation circuit as set forth in claim 1, characterized in that the resistance versus temperature characteristics of said compensation resistors comprising a combination of two or more kinds of resistors each made of single metal material are equivalent to the output voltage versus temperature characteristic of the bridge circuit itself, with the primary and secondary coefficients thereof included.

6. A temperature compensation circuit as set forth in claim 1, characterized in that said compensation resistors are connected in series with respect to the constant voltage or output voltage of the bridge circuit.

7. A temperature compensation circuit as set forth in claim 1, characterized in that said compensation resistors are connected in parallel with respect to the constant voltage or output voltage of the bridge circuit.

8. A temperature compensation circuit as set forth in claim 1, characterized in that said compensation resistors are a combination of three or more resistors each made of pure single metal material and are connected in a parallel-series combination.

* * * * *